United States Patent [19]

Lambert

[11] 4,172,618
[45] Oct. 30, 1979

[54] APPARATUS FOR ASSISTING MOVEMENT OF A FLOWABLE MATERIAL

[76] Inventor: George Lambert, 56 Mill La., Burscough nr. Ormskirk, Lancashire, England

[21] Appl. No.: 773,759

[22] Filed: Apr. 18, 1977

[30] Foreign Application Priority Data

Aug. 19, 1976 [GB] United Kingdom .............. 34570/76

[51] Int. Cl.² ........................ B65G 53/20; B65G 53/42
[52] U.S. Cl. .................................. 406/90; 239/425.5; 406/137
[58] Field of Search ........................ 302/19, 25, 29, 53, 302/31; 239/419.5, 425.5; 214/83.28

[56] References Cited

U.S. PATENT DOCUMENTS

| 2,219,283 | 10/1940 | Horn ........................................ 302/29 |
| 2,580,214 | 12/1951 | Bozich ..................................... 302/53 |
| 2,589,968 | 3/1952 | Schemm ................................... 302/29 |
| 2,715,549 | 8/1955 | Shields .................................... 302/52 |
| 2,975,915 | 3/1961 | Lindley .............................. 214/83.28 |
| 3,149,884 | 9/1964 | Jones ....................................... 302/53 |
| 3,801,020 | 4/1974 | Mocarski .......................... 239/425.5 |

FOREIGN PATENT DOCUMENTS 1305241  1/1973  United Kingdom ..................... 302/53

Primary Examiner—Robert B. Reeves
Assistant Examiner—Jeffrey V. Nase
Attorney, Agent, or Firm—Littlepage, Quaintance, Murphy, Richardson and Webner

[57] ABSTRACT

The invention facilitates the movement of particulate matter (such as a powder) over a surface by making the surface from a material which is porous to gas. In use, gas is forced up through the surface and into the particulate matter. This makes the particulate matter flow more easily over the surface. The invention is claimed to be particularly useful for assisting the flow of matter inside a tank to facilitate discharge of its load.

8 Claims, 4 Drawing Figures

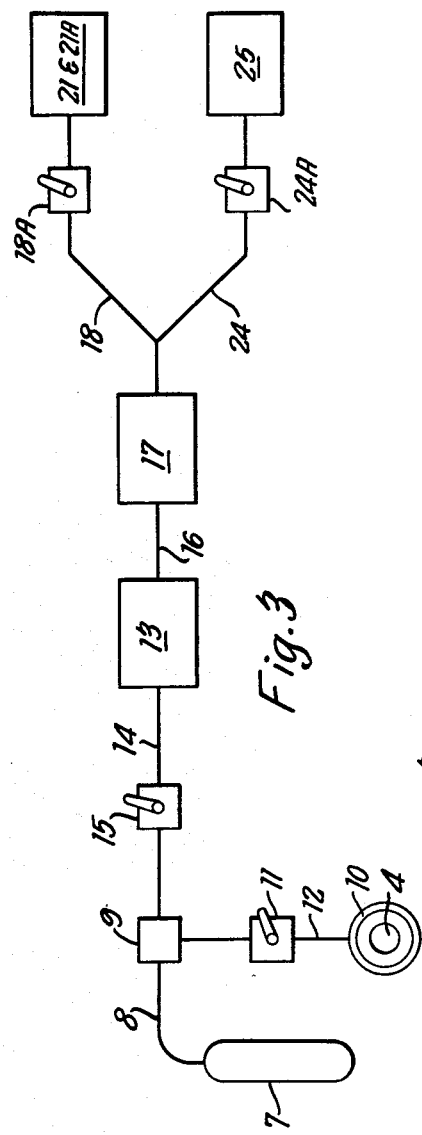
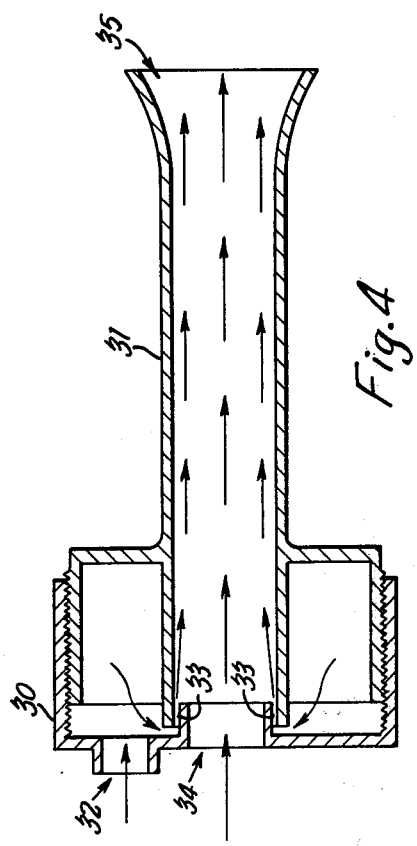

APPARATUS FOR ASSISTING MOVEMENT OF A FLOWABLE MATERIAL

BACKGROUND OF THE INVENTION

1. Field of the invention

This invention relates to apparatus for assisting movement of a flowable material, particularly a solid particulate material or a material containing solid particles; for example powders, granules, cement, concrete etc.

2. Description of the Prior Art

The invention arose from the problem that such materials are difficult to discharge from the containers in which they are transported. Hitherto such containers have had to be tipped through a substantial angle in order to discharge their contents and difficulty has been experienced in ensuring that the whole of the contents are discharged. Complicated and expensive equipment has been required to effect such discharge and the removal of residual matter has been time consuming and therefore expensive. It was primarily with these problems in mind that the present invention was conceived.

Another problem has been in ensuring that the containers are filled as completely as possible since access is often available only through ports which are spaced apart at the top of the container. In the regions between the ports, solid particulate material, when poured into the container tends to form pyramid or cone shaped piles in the container, whose peaks coincide with the access ports. Unfilled spaces are left between these piles. The invention can also be applied to overcome this problem.

Yet another problem is that friction of the particulate material on the base of the container during discharge causes abrasion thereby severely limiting the life of the container.

SUMMARY OF THE INVENTION

The invention provides apparatus for assisting movement of a flowable material in which a support for the material is formed of a substance which is porous to gas and in that means is provided for inducing gas to flow through the support to mix with the material.

The invention also provides a vessel for flowable material adapted to be sealed in an air-tight manner and comprising a floor which is porous to gas but not to the said material, means for introducing gas under pressure to a space below the floor and a discharge outlet for the material.

For the discharge of the material from a vessel constructed as defined in the immediately preceding paragraph, compressed gas, e.g. air or inert gas, is introduced into a plenum or space below the floor. The gas is forced through the floor into the main part of the container, thereby fluidising the particulate material so that it can easily flow towards the outlet. This flow of the material towards the outlet can be produced by the pressure of gas building up inside the container, by a slight tipping of the vessel, or preferably by both of these influences in combination.

A preferred feature is the provision of an inlet orifice for compressed air above the floor at a position remote from the outlet. When the bulk of material has been discharged, a blast of compressed air from this inlet can effectively remove almost all residual matter.

The invention is most applicable to generally cylindrical containers having one or a series of restricted inlet ports at the top. By introducing air through the floor whilst such a container is being charged with material it can be caused to settle substantially uniformally so that the container can be filled more nearly to capacity than has hitherto been practicable.

Means for filtering dirt from the air entering the space beneath the floor is preferably provided to prevent congestion.

The aforementioned floor or other support preferably includes a surface formed by a porous stainless steel material, for example that obtainable in sheets from Pall Europe (type E and other types).

Containers used for the bulk transport of powders or other particulate material can be very large and therefore contain a large weight of material. The aforementioned "floor" therefore has to be quite strong, and when, as is usual, the container is cylindrical, the floor should be curved so as to follow the contour of the cylindrical base. The aforementioned porous stainless steel is ideal in that it can bend to the required curvature and is sufficiently strong to withstand the load placed on it. Nevertheless, suitable support is preferably provided between the floor and the bottom of the cylindrical container. Such support can conveniently be provided by longitudinal air channels to which air, or other gas is supplied from a suitable source. In this particular arrangement the channels have openings through which the gas issues to a position immediately below the floor from whence it is forced upwardly through the floor.

A particular embodiment of the invention will now be described by way of example with reference to the accompanying drawings.

BRIEF DESCRIPTION OF THE DRAWINGS

FIG. 3 is a schematic diagram showing the flow path of compressed gas; and

FIG. 4 is an axial cross-section of a Venturi action device which directs a blast of air onto the floor of the tank to remove residual matter.

DESCRIPTION OF A PREFERRED EMBODIMENT

Figure 1:
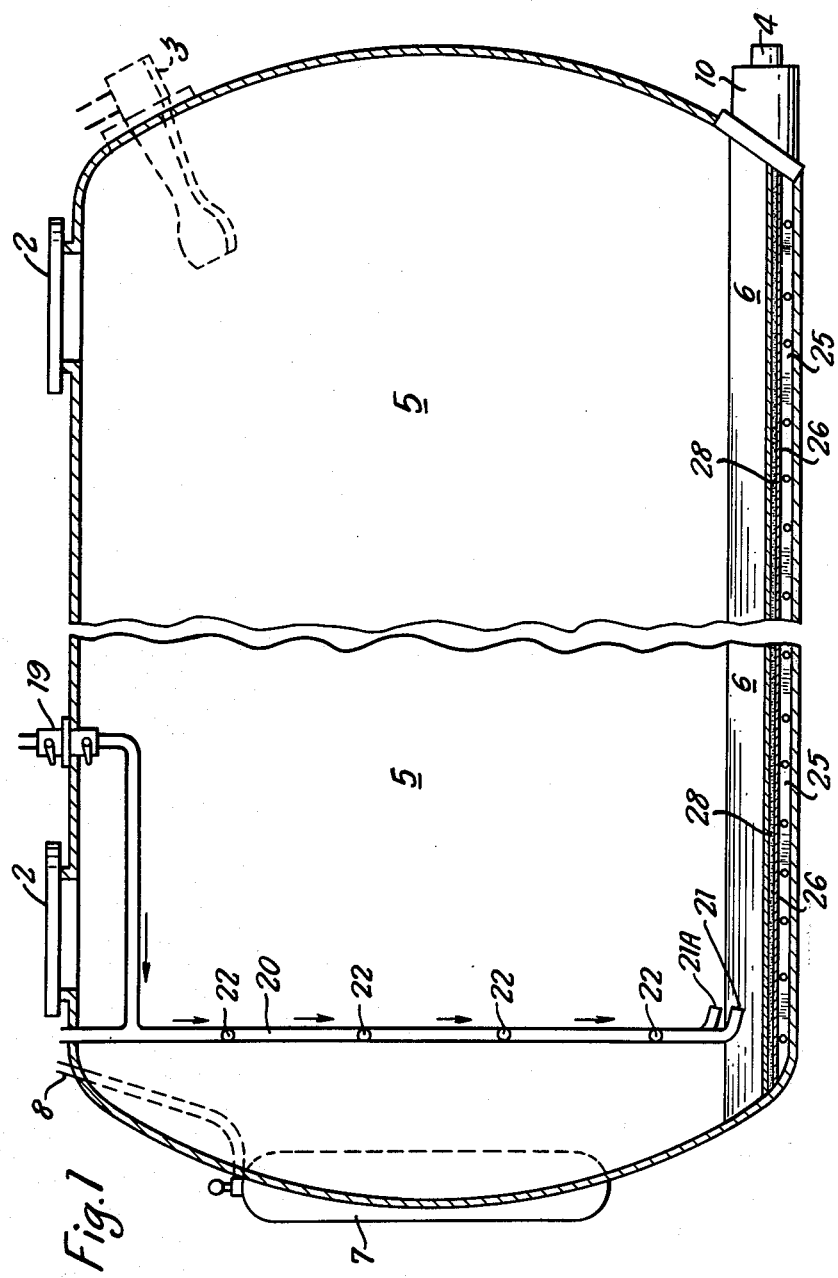
FIG. 1 is a vertical axial cross-section through a tank constructed in accordance with the invention.
Figure 2:
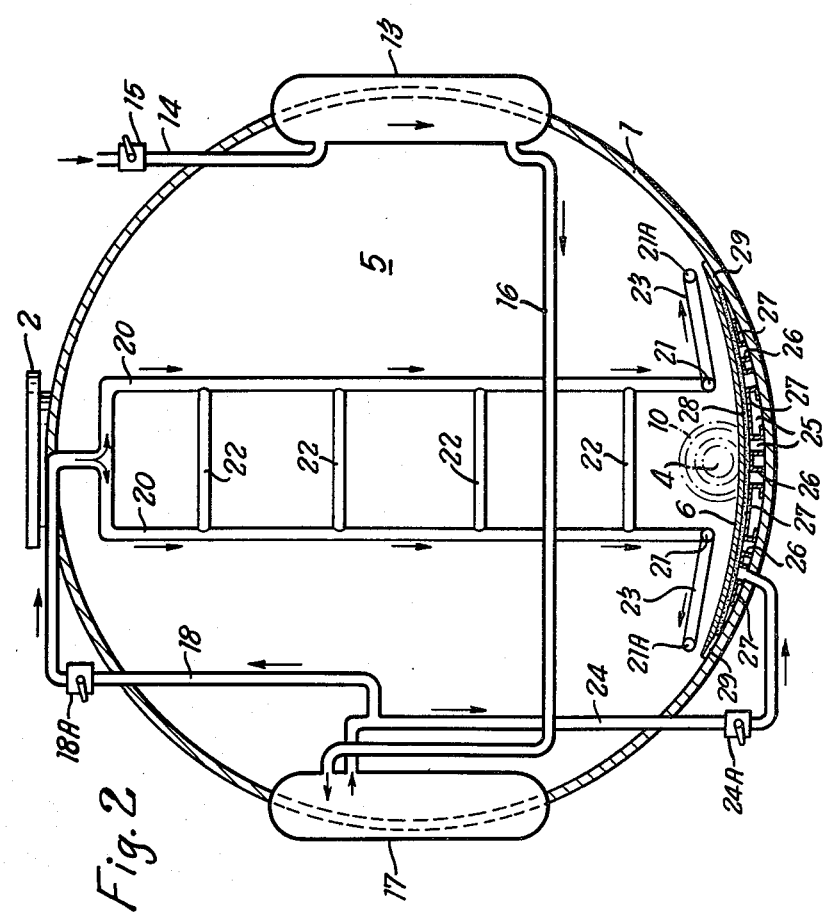
FIG. 2 shows the tank as viewed in direction II indicated in FIG. 1, the end wall of the tank being removed to reveal the interior.

Referring now to FIGS. 1, 2 and 3 of the drawings, there is shown a cylindrical vessel 1 designed to withstand internal pressure. The vessel has a series of manlids 2 at the top through which material to be transported is introduced. Alternatively a special injecting nozzle 3, which is optional, can be used. At the rear end of the vessel is a discharge port 4 which communicates with the main storage space 5 of the container above a floor 6 thereof.

At the other, front end of the container cylinders 7 of compressed gas are supported, though it should be pointed out that in alternative arrangements an air compressor could be used instead.

A duct 8 leads from the source of compressed gas to a manifold 9 (FIG. 3) which is located at the rear of the vessel and from which the gas is distributed to a Venturi device 10 in the outlet port 4 through a valve 11, and duct 12; and to an air cleaner 13 via duct 14 and valve 15.

From the cleaner 13 the gas (which may be air) passes through duct 16 to a drier 17. On emerging from the drier 17 the clean dry gas is split into two streams. One stream returns through duct 18 and valve 18A to the front of the vessel which it enters through connector 19 as shown in FIG. 1. It then passes through twin vertical ducts 20 to inlet orifices 21 fitted with Venturi action nozzles, not shown in FIG. 1. The ducts 20 have horizontal rungs 22 connected across them. These are shown best in FIG. 2 and form a ladder in conjunction with the ducts 20. FIG. 2 shows ducts 23 extending outwardly from the bottom ends of ducts 20 and terminating at additional orifices 21A.

The other stream of clean dry gas from the drier passes through duct 24 and valve 24A to a space or plenum 25 (FIG. 2) which is defined below the floor 6 of the vessel. The floor 6 is supported by longitudinal duct members which are made from sheet metal bent to form an inverted "U" cross-section. The upper and side surfaces of members 26 are formed with a plurality of holes to allow passage of gas upwardly and side ways. Alternatively, instead of having holes, the sides may be notched at their bottom edges. In an alternative construction, not shown, it would be possible to use a combination of longitudinal and transverse ducts instead of just the longitudinal ducts 20 illustrated.

Filling the spaces between the ducts 20 are members 27 formed of a grating or like material having a plurality of interstices, also to allow the passage of gas. These members 27 have an upper surface which is flush with the upper surfaces of the ducts and over both of these is laid a layer 28 of wire wool. The floor 6 is made of porous stainless sheets laid on top of the wire wool, each one bending so as to extend circumferentially but at a slightly greater radius of curvature than the cylindrical container itself. Longitudinal strips 29 are welded to the inner surface of the tank and the porous sheets are welded to these. The strips 29 provide the necessary strength to fulfil safety requirements. The individual stainless steel sheets overlap and are welded to each other.

The illustrated embodiment of the invention can easily be made starting from a standard container since the parts necessary for the construction of the floor can be introduced through the charging ports and then welded in position. The porous stainless steel sheets can be flexed sufficiently to enable them to enter the ports. Alternatively, when manufacturing a new container, the stainless steel sheets can be fitted during assembly of the container.

FIG. 4 shows a Venturi nozzle device for fitting to the outlet orifices 21, 21A. This is formed of two housing parts 30 and 31 which are held together by co-operating screw-threads. The compressed gas enters from orifice 21 or 21A through inlet 32 and is forced through an annular opening 33 to form a jet which entrains further air entering through the port 34. A relatively small volume of high pressure air is thus used to produce a blast formed by a relatively large volume of low pressure air; and this blast of air issues from orifice 35 and sweeps onto the floor 6 towards the outlet 4.

In order to fill the container the man-lids 2 are opened one by one and the load is introduced into that portion of the tank which is immediately below it. Alternatively the special nozzle 3 can be used for loading. Compressed gas is then introduced into the plenum 25 by opening valves 15 and 24A. The air is forced up through the floor 6 and mixes with the load thereby making it behave more like a fluid. As a result the load tends to settle, forming a more level upper surface; and more material may then be introduced.

In order to discharge the load the container is tilted slightly, with the front end uppermost, and the valves 11, 15 and 24A are opened. The air flowing up through the floor again makes the load assume a relatively fluid condition allowing it to flow easily to the outlet 4: partly under the action of gravity, partly under the pressure building up inside the container, and partly under the action of the air supplied to the Venturi device 10 (which in its principle of operation is similar to the device of FIG. 4 and therefore need not be described in detail).

When the container is nearly empty the valve 18A is opened. This produces a blast of air from orifices 35 which sweeps residual material towards the outlet 4 from which it is discharged. By regulating the valves 11, 18A and 24A the optimum performance can be achieved.

The illustrated container was primarily designed to be transported by road, rail or boat but could alternatively be used simply for storage purposes. An important feature of this embodiment is that the container need be inclined only at a relatively small angle during the discharge operation thereby avoiding the need for expensive tipping mechanisms. Also, the load is discharged quickly and with sufficient force to drive it along a pipe-line to the particular spot where it is to be used.

It is emphasised that the illustrated embodiment of the invention has been described only as one particular example of how the invention can be applied. There are other forms the invention can take. For example, it would be possible to convey materials continuously from one position to another, along a duct or pipe-line constructed in accordance with the invention.

I claim:

1. Apparatus for controlling the movement of a finely divided, flowable material with respect to a bulk container therefor, the apparatus comprising:
    (A) support means defining within the container a supporting surface being pervious to the flow of a gas,
    (B) means for inducing a gas to flow through the support means to fluidize the flowable material within the container,
    (C) means for controlling the flow of a fluid, and
    (D) means for enabling a selective flow of the fluid to be directed across the support means such that flowable material on the support means can be swept in a predetermined direction, said means for enabling selective flow of fluid comprising:
        (1) an inlet orifice on the container for the fluid,
        (2) a first fluid duct having first and second ends, the first end connecting with the inlet orifice, and
        (3) a venturi unit having first and second fluid inlets and an outlet positioned as to be able to direct the fluid output from the venturi unit across said support means, the first fluid inlet of the venturi being connected to the second end of the fluid duct to receive fluid delivered to the duct and the second inlet of the venturi being in communication with the interior of the container whereby pressurized fluid introduced into the duct entrains gas within the container and admixes therewith to produce said flow of fluid.

2. Apparatus as claimed in claim 1, further comprising
a second fluid duct having first and second ends, the first end of the second fluid duct connecting with said inlet orifice,
a second venturi unit having first and second fluid inlets and an outlet, the venturi positioned as to be able to direct the output from the outlet the second venturi across the support means, the first inlet of the second venturi being connected to the second end of the second duct to receive fluid delivered to the second duct and the second inlet of the second venturi being in communication with the interior of the container whereby pressurized fluid introduced into the second duct entrains gas within the container and admixes therewith to produce said flow of fluid.

3. Apparatus as claimed in claim 2, in which said first and second ducts comprise the side rails of a ladder structure for enabling a person to enter and leave the lower regions of the interior of the container.

4. Apparatus as claimed in claim 1 in which the container further comprises an outlet for the flowable material including a material eductor unit.

5. Apparatus as claimed in claim 4, in which the material eductor unit comprises means for feeding a compressed gas to the flowable material as the flowable material passes through the outlet.

6. Apparatus as claimed in claim 5 in which the material eductor unit comprises a venturi unit whereby compressed gas applied thereto acts to at least assist the flow of flowable material through the outlet of the container.

7. Apparatus as claimed in claim 6 in which the pressure of the compressed gas is sufficiently high enough to be able to pump the flowable material from the container.

8. Apparatus as claimed in claim 1 in which the support means provides the floor of the container and comprises a composite multi-layer structure including a first layer previous to a gas flow which cooperates with the flowable material and whose peripheral regions are hermetically sealed to the container wall, an intermediate layer having an open multicellular or fibrous (wool-like) formation, and a third layer cooperating with the second layer on the side thereof remote from the first layer to form a plenum for receiving gas to be thereafter directed through the layers of the floor into the container thereby fluidizing the flowable material within the container.

* * * * *